Oct. 22, 1963    P. B. KELLER    3,107,393
APPARATUS FOR AND METHOD OF FABRICATING O-RINGS
Filed Feb. 16, 1959    7 Sheets-Sheet 1

INVENTOR:
Philip B. Keller
By Smyth & Roston
Attorneys

Oct. 22, 1963 P. B. KELLER 3,107,393
APPARATUS FOR AND METHOD OF FABRICATING O-RINGS
Filed Feb. 16, 1959 7 Sheets-Sheet 2
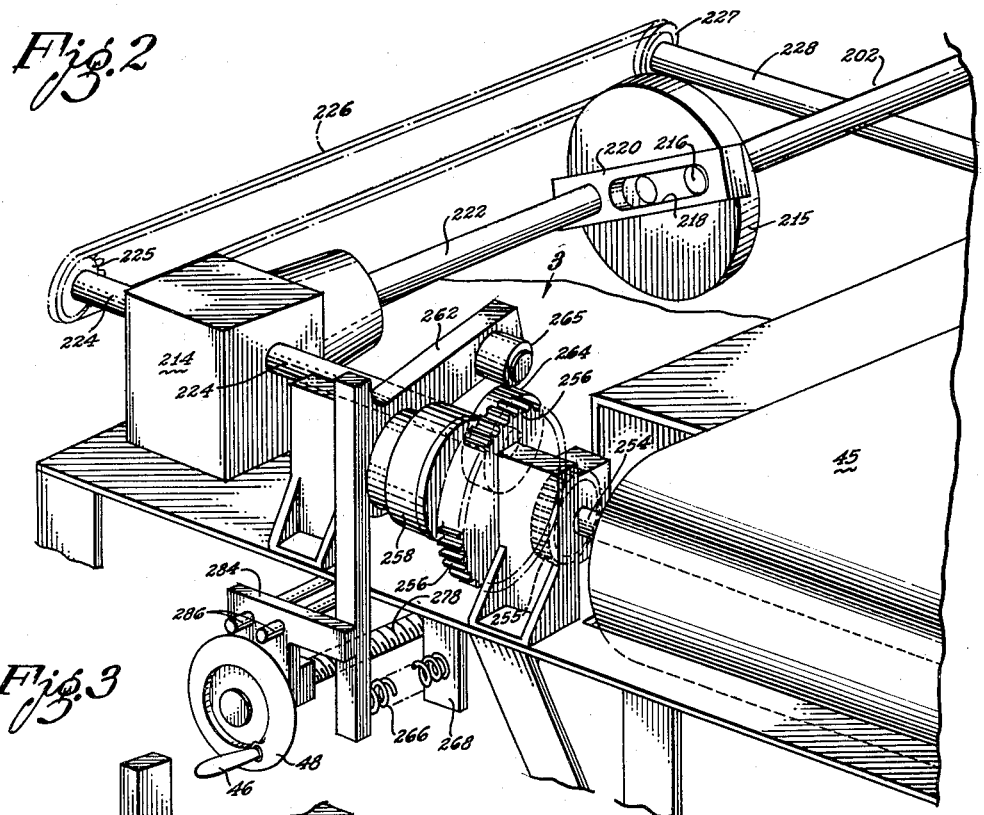
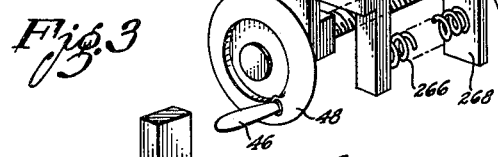
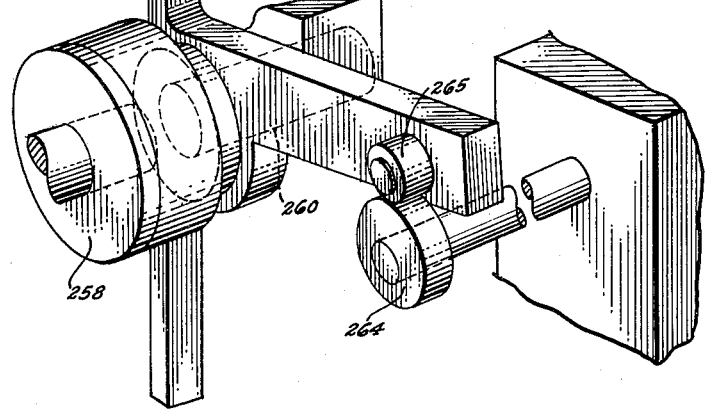
INVENTOR:
Philip B. Keller
Attorneys

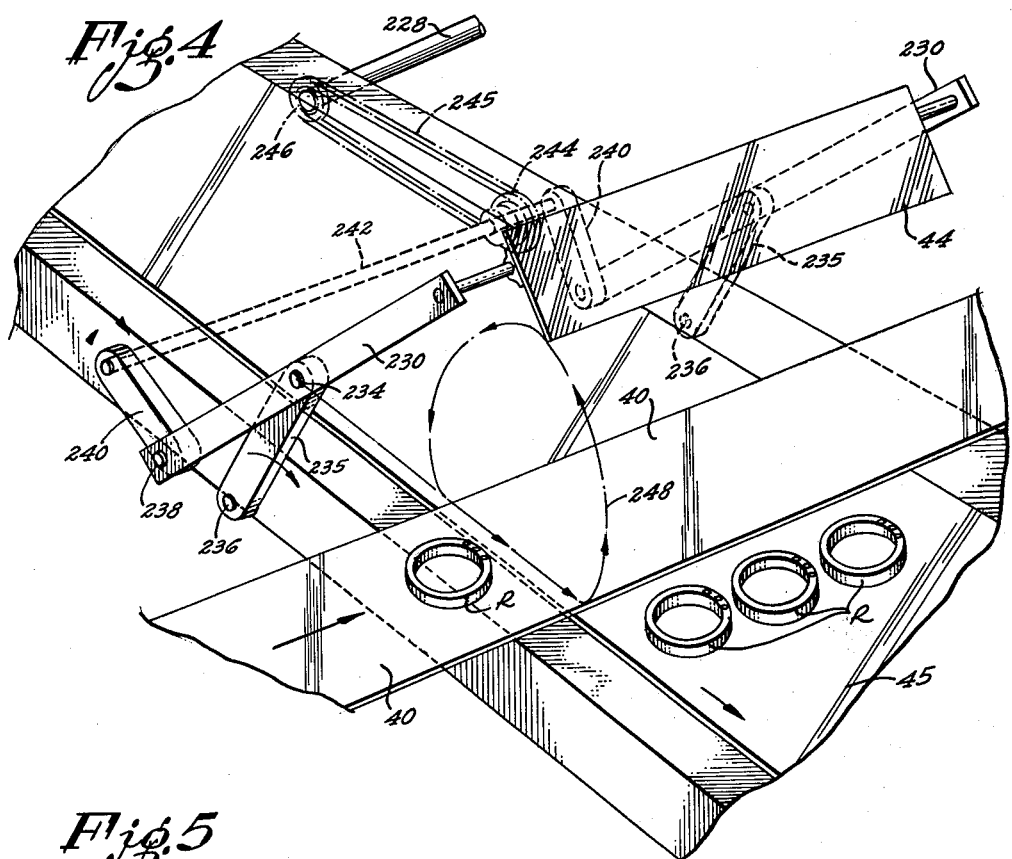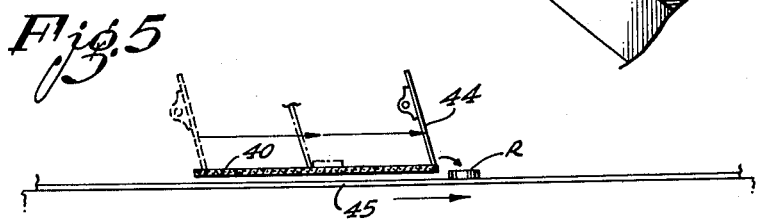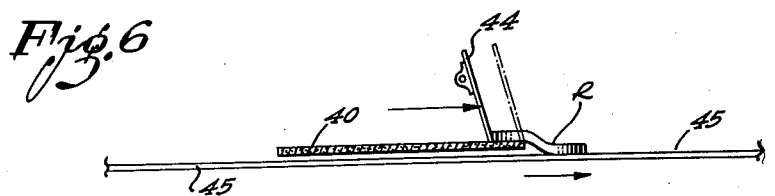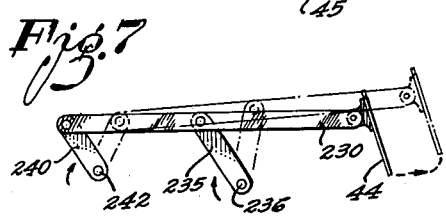

Oct. 22, 1963  P. B. KELLER  3,107,393
APPARATUS FOR AND METHOD OF FABRICATING O-RINGS
Filed Feb. 16, 1959  7 Sheets-Sheet 5

INVENTOR:
Philip B. Keller

By Smyth & Roston
Attorneys

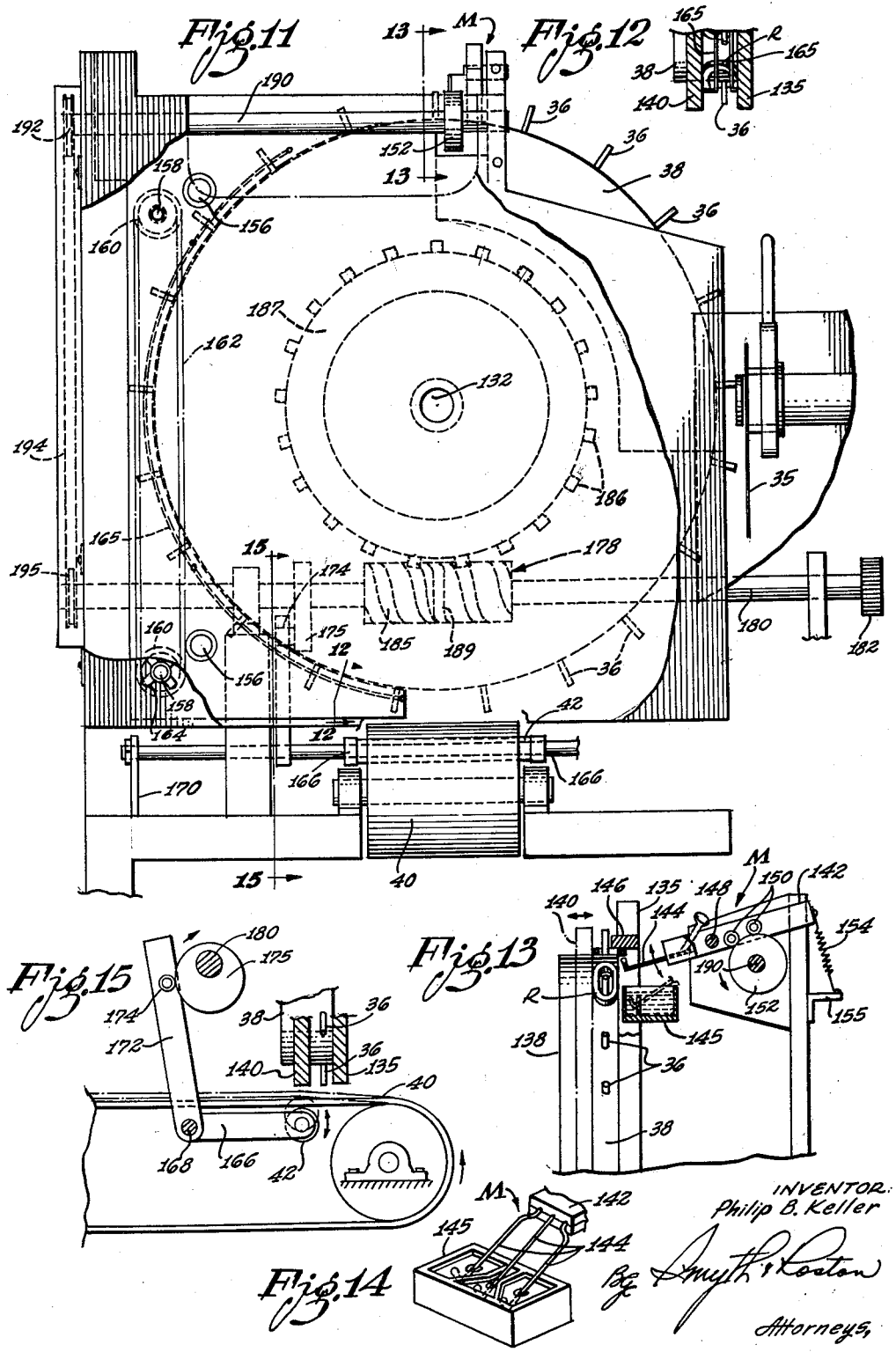

Oct. 22, 1963     P. B. KELLER     3,107,393
APPARATUS FOR AND METHOD OF FABRICATING O-RINGS
Filed Feb. 16, 1959     7 Sheets-Sheet 7
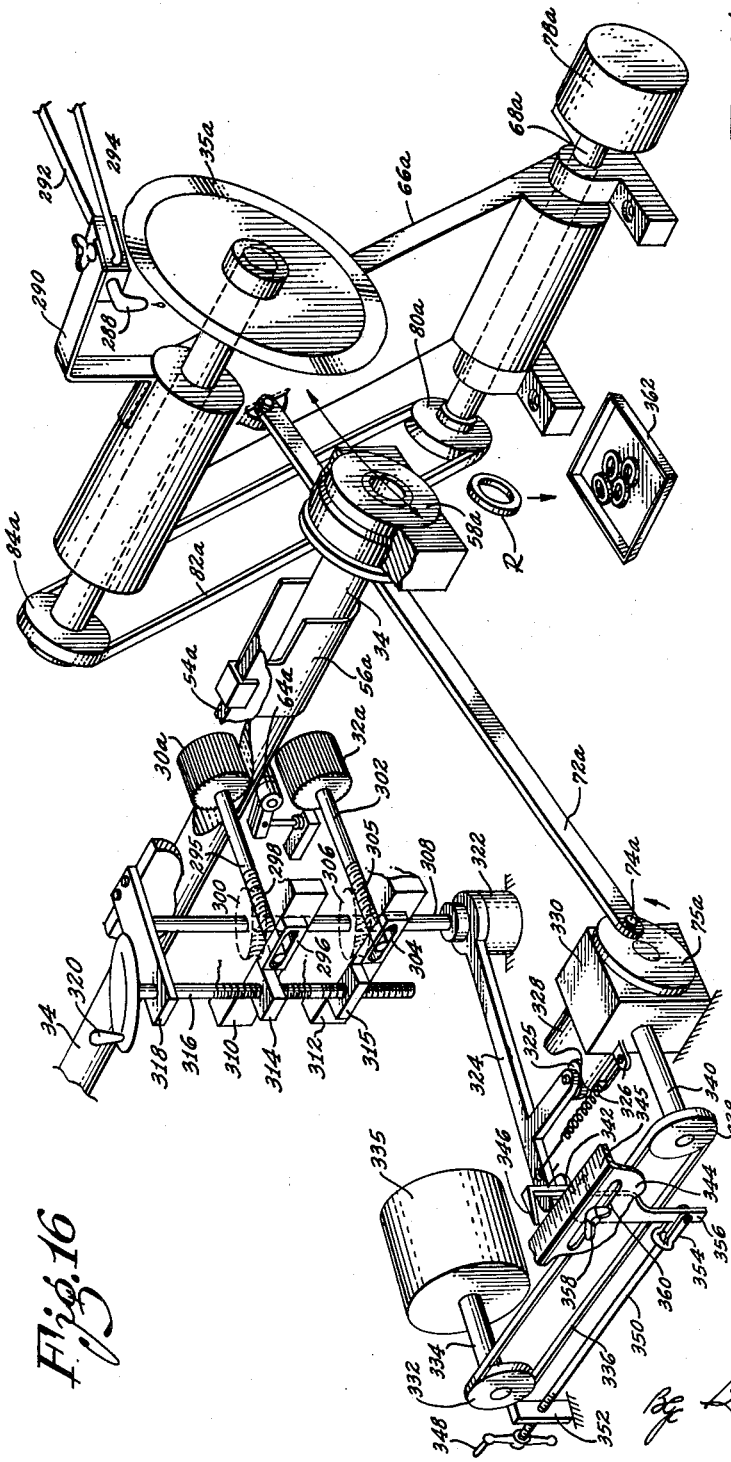
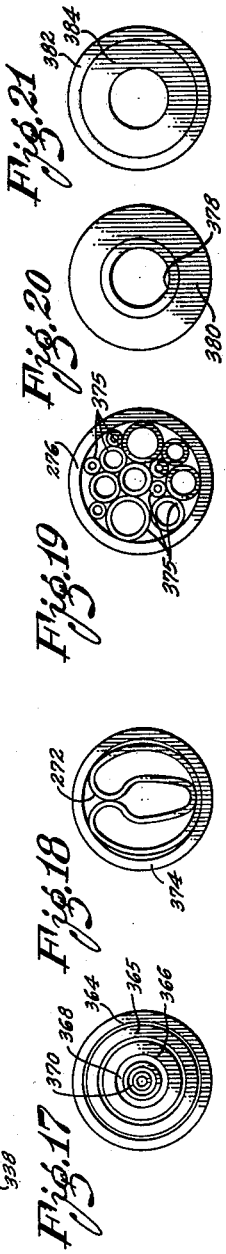
INVENTOR:
Philip B. Keller
By Smyth & Roston
Attorneys United States Patent Office 3,107,393
Patented Oct. 22, 1963

3,107,393
APPARATUS FOR AND METHOD OF
FABRICATING O-RINGS
Philip B. Keller, 245 Tavistock Ave., Los Angeles, Calif.
Filed Feb. 16, 1959, Ser. No. 793,549
14 Claims. (Cl. 18—4)

This invention relates to an apparatus for the fabrication of O-rings for uncured elastomer stock.

O-rings are commonly fabricated by punching uncured rings from sheet stock, applying identifying indicia to the rings, and then molding and curing the rings. Only a minor portion of an uncured sheet goes into the rings that are punched therefrom and the remaining material is re-milled to form a new sheet. One disadvantage of such a fabricating procedure is that it is extremely difficult to eliminate bubbles and air pockets from the milled sheets. Another disadvantage of the method is that the elastomer material deteriorates from repeated milling. A further disadvantage is that crow's-feet and other defects are commonly formed in the sheets by the milling operation, which defects often survive in the finished O-rings. A still further disadvantage is that the stamping operation inherently produces O-rings of tapered cross-sectional configuration, which configuration is not the best configuration for filling the final curing mold. Another disadvantage is the cost of handling the O-rings in the course of the fabrication procedure since the procedure does not lend itself readily to automation.

The present invention avoids all of these disadvantages by extruding uncured elastomer to form tubular stock, slicing the tubular stock to form uncured rings, and then molding and curing the rings. If identifying indicia are desired, the rings are marked before the curing operation in the usual manner. It is not difficult to eliminate bubbles and voids in the extrusion operation. Uniform excellent quality is achieved because the elastomer material is milled only once. A further advantage of the procedure is that the sliced tubing increments are of a desirable configuration for the final molding and curing steps.

The invention minimizes handling by providing an apparatus that carries out the process in a completely automatic manner up to the final step of molding and curing the O-rings. First, the tubular uncured stock is advanced intermittently to a severing station where increments are sliced off to form the successive uncured rings. The sliced rings are conveyed past a marking station where they are marked with indicia and then the marked rings are deposited in sequence on a moving transfer belt to form a row thereon. The transfer belt passes over a wider main conveyor belt transversely thereof and suitably timed cyclic means sweeps successive rows of the uncured rings off the transfer belt onto the underlying conveyor. A feature of one practice of the invention is that the main conveyor belt carries open curing molds providing rows of molding cavities into which the rows of rings from the cross belt are deposited directly from the transfer belt.

One problem to which the invention is directed is to advance the uncured tubular stock in a manner that provides adjustment of the increments of advance thereby to control the thickness of the sliced rings. As will be explained, this problem is solved by employing a reciprocating actuating member to advance the tubular stock intermittently with a cam moving the member in one direction and spring means moving the cam in the other direction and with an adjustable stop to limit the return spring movement.

Another problem to which the invention is directed is to convey the severed rings from the severing station to the station for marking indicia on the rings and then to convey the rings to the transfer belt that carries the rings across the main conveyor. To meet this problem the invention provides a conveyor wheel with radial pins on its periphery to receive the uncured rings from the severing station and provides means on the opposite sides of the path of movement of the rings to narrow or flatten the rings for marking. The wheel turns intermittently with its intermittent movements synchronized with the severing means and with the marking means. At each of the periodic pauses of the wheel a ring is received from the severing means, an immobilized flattened ring is marked with indicia at the marking station, and a marked ring is dropped from the wheel onto the transfer belt.

Since the apparatus is used for fabricating runs of O-rings of different diameters, a certain problem arises in that the center-to-center spacing of the O-rings on the cross belt should vary with the diameter of the O-rings. To solve this problem the conveyor wheel that deposits the O-rings on the transfer belt is rotated at a substantially constant rate and the transfer belt is speeded up for receiving O-rings of the larger sizes. This expedient creates a further problem since the main conveyor also moves intermittently and both the main conveyor and the means for sweeping the O-rings off the transfer belt must also be speeded up. In addition the frequency of operation of the sweeping means must be increased with the increased rate of travel of the transfer belt and the magnitude of the intermittent advances of the main conveyor must also be increased to increase the center-to-center spacing of the rows of the larger O-rings that are deposited on the main conveyor.

To solve these problems, the transfer belt and the main conveyor are driven by a common power means and two adjustments are provided, the two adjustments being interlocked for simultaneous manipulation. One adjustment varies the speed of the power means and thereby speeds up the travel of the transfer belt and increases the frequency of operation of the means that sweeps the uncured rings off the transfer belt onto the main conveyor. This same adjustment also increases the frequency of the advances of the main conveyor in accord with the increased frequency of the operation of the means that sweeps the rings from the transfer belt onto the main conveyor. The second adjustment means varies the magnitude of the intermittent advances of the main conveyor.

When the diameter of the rings in process is increased, these two interconnected adjustments are manipulated to speed up the transfer belt, to increase the frequency at which the rings are swept from the transfer belt onto the main conveyor, to increase the frequency of the intermittent advances of the main conveyor, and to increase the magnitude of the intermittent advances of the main conveyor. Consequently, the center-to-center spacing of the successive rings on the transfer belt is increased and the center-to-center spacing of the successive rows of rings on the main conveyor is also increased. These adjustments make it possible to use the full capacity of the transfer belt and the main conveyor at all times.

The features and advantages of the invention may be understood from the following description together with the accompanying drawings.

In the drawings, which are to be regarded as merely illustrative;

FIG. 2 is an enlraged fragmentary perspective view showing the adjustable mechanism for intermittently advancing the main conveyor and also the mechanism for operating the sweep means with cyclic acceleration thereof;

FIG. 3 is fragmentary perspective view of a portion of the mechanism shown in FIG. 2 for intermittently advancing the main conveyor;

FIG. 4 is a perspective view of the cyclic means for sweeping the sliced rings from the transfer belt onto the main conveyor;

FIG. 5 is a diagrammatic view showing the operation of the sweeping means in transferring a row of relatively small O-rings onto the main conveyor;

FIG. 6 is a similar view illustrating the operation of transferring a row of relatively large O-rings onto the main conveyor;

FIG. 7 is a diagrammatic view showing how the cyclic sweep means moves across the belt;

FIG. 11 is a side elevation of the conveyor wheel that receives the successive sliced rings, moves the successive rings past a marking station and then deposits the succesive rings on the transfer belt;

FIG. 12 is an enlarged sectional detail taken as indicated by the line 12—12 of FIG. 11 and showing the arcuate wires that keep the marked rings from dropping from the conveyor wheel until the rings reach the position for dropping onto the transfer belt;

FIG. 13 is a view partly in section and partly in side elevation showing the mechanism for applying indicia to the sliced rings at the marking station;

FIG. 14 is a fragmentary perspective view of the marking means;

FIG. 15 is a fragmentary sectional view along the line 15—15 of FIG. 11 and showing the mechanism for intermittently flexing the transfer belt upward under the conveyor wheel;

FIG. 16 is a simplified perspective view of an alternate mechanism for intermittently advancing and slicing uncured tubular stock; and FIGS. 17 to 21 are elevational views showing how tubes of uncured elastomer may be telescoped together for mutual support and for severance of a multiplicity of rings by each severing operation.

GENERAL ARRANGEMENT

Figure 1:
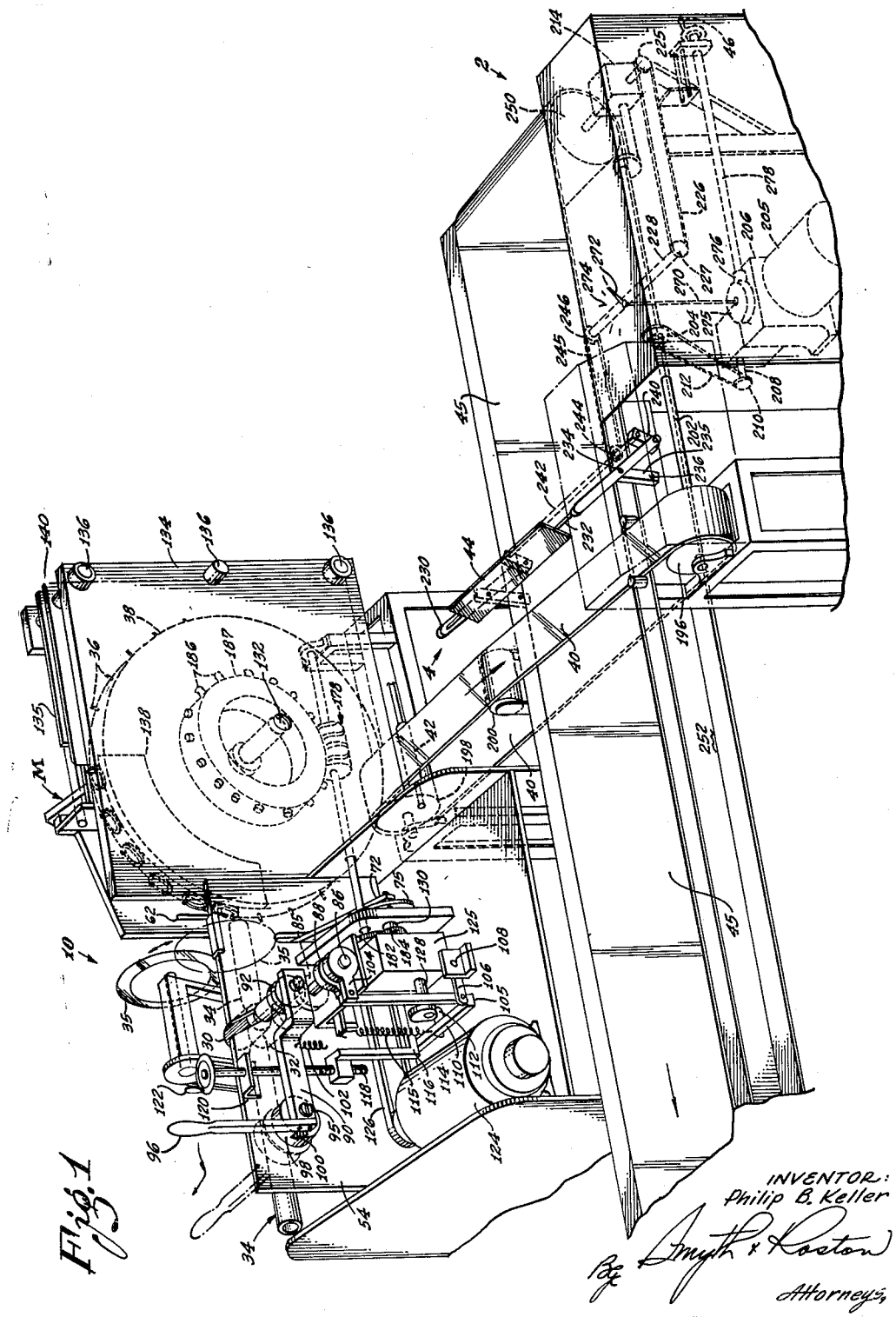
FIG. 1 is a perspective view of a selected embodiment of the invention.

FIG. 1 shows means including an upper serrated roller 30 and a lower serrated roller 32 to advance an uncured elastomer tube 34 intermittently to a severing station. At the severing station a rotary knife 35 slices increments from the elastomer tube to form successive uncured rings, the rings being designated by the letter R. The rotary knife 35 reciprocates across the path of the advancing elastomer tube 34 in synchronism with the intermittent operation of the serrated rollers 30 and 32. Provision is made for varying the increments of advance of the uncured tube 34 thereby to vary the thickness of the rings that are sliced therefrom.

The successive severed rings R are engaged by successive radial pins 36 on the periphery of a conveyor wheel that is generally designated by numeral 38. The newly received severed rings R are carried upward and contracted laterally to flattened configuration as they reach a marking station where a marking means, generally designated M, applies indicia to the uncured rings in a well-known manner. The indicia usually comprises a row of dots of contrasting colors. The conveyor wheel 38 is actuated intermittently in synchronism with the reciprocation of the rotary knife 35 to stop momentarily to receive each successive sliced ring and to cause each ring to pause at the marking station. Also at each pause of the conveyor wheel 38, a marked ring R drops therefrom onto a transfer belt 40 thereby forming a row of the rings on the belt.

As each successive pin 36 on the periphery of the conveyor wheel 38 reaches its lowermost position to drop a ring on the transfer belt 40, a reciprocating roller 42 under the belt flexes the belt upward towards the pin to cause the belt to receive the ring without any opportunity for the ring to roll. Thus the provision of the reciproctive roller 42 insures accurate positioning of the successive rings on the transfer belt.

The perodic deposit of the rings R on the transfer belt 40 at a constant frequency continuously forms a longitudinal row of the rings on the transfer belt and a sweep means in the form of a blade 44 operates in timed relation with the belt to push successive rows of the O-rings from the belt onto a main conveyor belt 45. The main conveyor belt 45 is advanced intermittently in synchronism with the cycle of the blade 44 to space apart the rows of rings.

It is contemplated that with the conveyor wheel 38 operating at a constant rate to deposit successive rings on the transfer belt 40, the rate of travel of the transfer belt, the frequency of operation of the sweeper blade 44, the frequency of advance of the main conveyor belt 45 and the magnitude of the periodic advance of the main conveyor belt with all be adjustable to vary the center-to-center spacing of the rings on the transfer belt and the center-to-center spacing of the successive rows of rings on the main conveyor belt in accord with the different sizes of O-rings that are fabricated. If relatively small O-rings are in process, the transfer belt moves more slowly for relatively close center-to-center spacing of the rings and the main conveyor belt 45 not only advances less frequently but also advances by lesser increments for relatively close center-to-center spacing of the rows of rings thereon. In this regard, a feature of the invention is the provision of a single adjustment mechanism operated by a crank 46 to make all of these adjustments simultaneously, the various adjustments being interlocked for this purpose.

Figure 8:
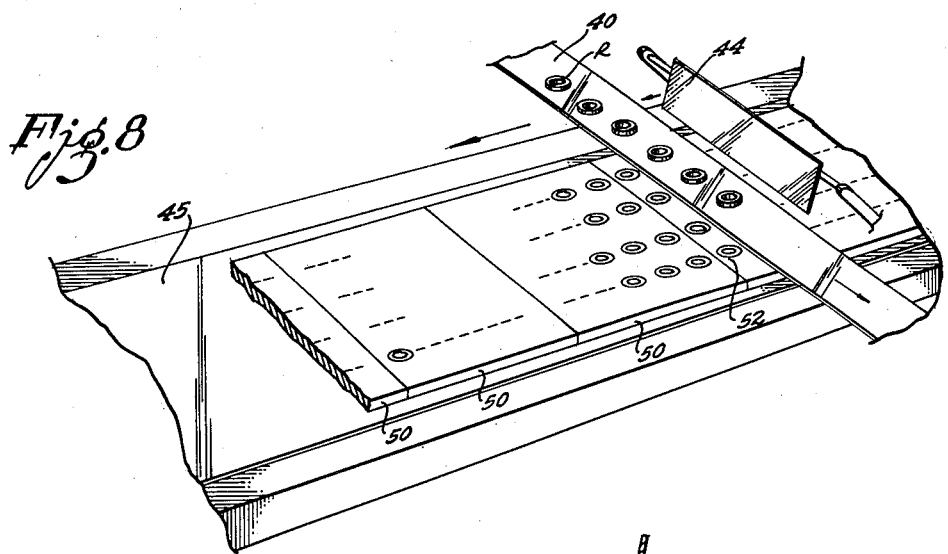
FIG. 8 is a perspective view showing a row of open curing molds positioned on the main conveyor, which molds provide rows of mold cavities to receive the rows of sliced rings that are swept from the transfer belt.

FIG. 8 shows how, if desired, a series of curing molds 50 with rows of molding cavities 52 may be carried by the main conveyor belt 45 to receive the successive rings from the transfer belt 40.

*Mechanism to Advance and Slice the Tubular Stock*

FIGS. 1 AND 10

Figure 10:
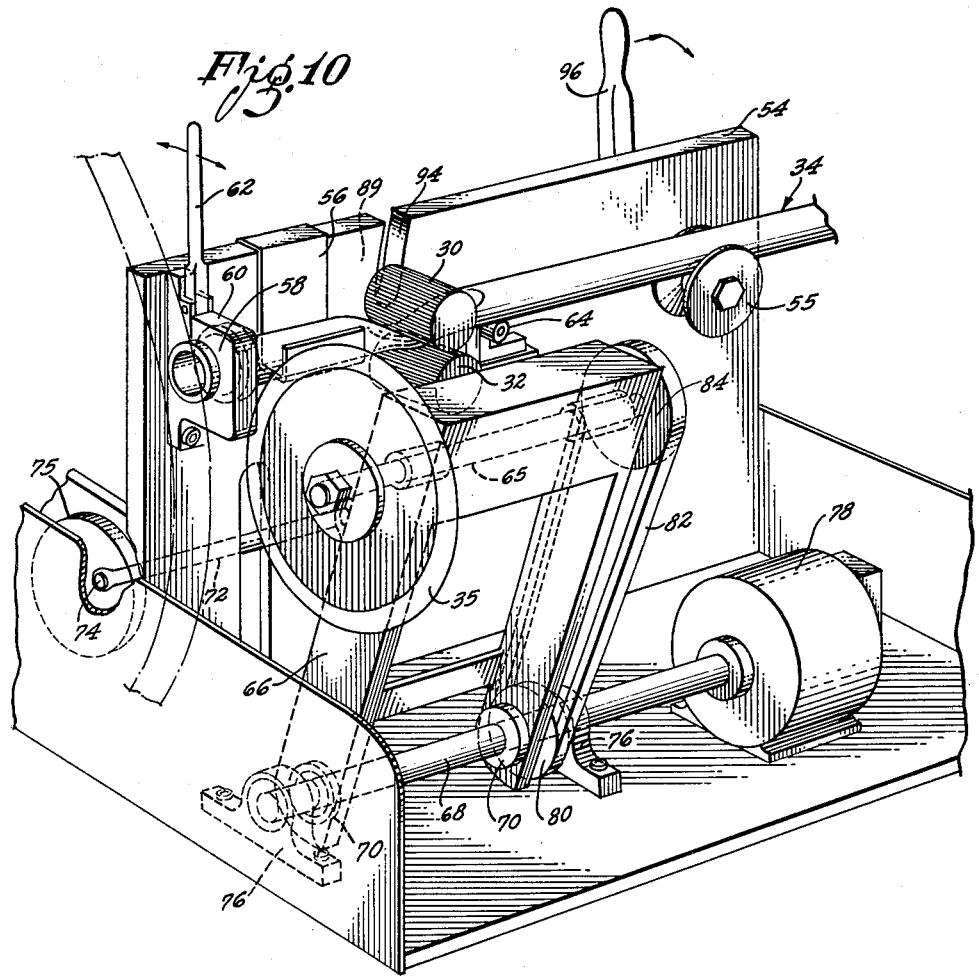
FIG. 10 is an enlarged fragmentary perspective view showing the mechanism for intermittently advancing the uncured tubular stock and for intermittently severing rings therefrom.

As shown in FIG. 10, the structure for intermittently advancing the uncured elastomer tube 34 may be mounted on an upright support plate 54. In the construction shown, the means for advancing the uncured tube includes a flanged guide roller 55, the previously mentioned pair of serrated rollers 30 and 32 and a flanged sheet metal guide 56. From the guide 56, the advancing tube enters a bushing 58 that holds the end of the tube in position for severance by the rotary knife 35. Suitable means (not shown) sprays water onto the leading end of the uncured tube to lubricate the cutting action of the rotary knife in a well known manner.

The bushing 58 is releasably mounted by a clamp means 60 that is operable by a convenient handle 62. When a change-over is made from fabricating rings of one size to fabricating rings of a different size, the bushing 58 is accordingly replaced by a bushing of the new size.

Preferably a switch 64 is positioned under the traveling tube 34 adjacent the pair of serrated rollers 30 and 32 to sense the presence of the tubular stock and to stop the operation of this part of the apparatus when the stock runs out. For this purpose, the switch 64 locally supports the traveling uncured tube 34 and is normally closed by the weight of the tube. In the absence of the weight of the tube, the switch 64 opens to stop the mechanism.

The rotary knife 35 is carried by a countershaft 65 on the upper end of a frame 66. The lower end of the frame 66 is pivotally mounted on a drive shaft 68 by spaced bearing 70 and the frame is oscillated about the axis of the drive shaft for reciprocation of the rotary blade. For this purpose a link 72 connects the frame 66 with a crank pin 74 on a gear 75. The drive shaft 68, which is mounted in suitable bearings 76, is actuated by a motor 78 for driving the rotary knife 35. For this purpose, a drive sheave 80 on the drive shaft 68 is connected by a belt 82 with a driven sheave 84 that is keyed to the counter shaft 65. Opening of the switch 64 deenergizes the motor 78.

The lower serrated roller 32 is unitary with a gear 85 and is actuated by a rocker shaft 86, the serrated roller being connected to the rocker shaft by a unidirectional clutch 88 to respond to only one direction of oscillation of the rocker shaft. The upper serrated roller 30 is carried by a stub shaft 89 (FIG. 10) journaled on the end of an arm 90. The stub shaft 89 carries a second gear 92 that meshes with the first gear 85 whereby the two serrated rollers are driven in unison. The arm 90 may be swung upward to lift the upper roller 30 for admitting new tubular stock between the two serrated rollers, the upright support plate 54 having an arcuate slot 94 (FIG. 10) to clear the stub shaft 89 for this purpose.

The arm 90 is mounted on a pivot means 95 and is controlled by an upright handle 96. The pivot means 95 carries a fixed latch disk 98 with a latch recess 100 therein to receive a latching lug (not shown) of the arm 90. When the handle 96 is swung to the dotted line position in FIG. 1 to elevate the upper serrated roller 30, the handle may be pulled slightly sidewise to cause the latching lug to engage the latch recess 100 to hold the serrated roller temporarily elevated. The weight of the arm 90 and the structure thereon may be relied upon to cause the upper serrated roller 30 to exert adequate downward pressure for cooperating with the lower serrated roller 32 to advance the uncured tube 34. A coiled tension spring 102 may be added, however, to exert downward pull on the arm 90 for this purpose.

The rocker shaft 86 is connected by a rocker arm 104 with an upright reciprocative member 105. Below the rocker arm 104, the reciprocative member 105 is stabilized and guided by a link 106 that is parallel with the rocker arm and is of substantially the same length as the rocker arm, the link being mounted on a fixed pivot 108. The reciprocative member 105 is of angular configuration with a lower horizontal portion 110 that carries a follower 112 in the form of a roller for cooperation with a cam 114. A suitable coil spring 115 exerts upward pull on the reciprocative member 105 to urge the follower 112 towards the periphery of the cam 114.

A suitable stop member 116 adjustably carried by a downwardly extending screw 118 is positioned above the horizontal portion 110 of the reciprocative member to limit the range of the upward return movement by the coil spring 115. The screw 118 is journaled in a bracket 120 and secured therein against axial shift and the upper end of the screw carries a small crank 122 for rotation to vary the position of the stop member 116.

It is apparent that with the cam 114 rotating continuously, the cam cooperates with the follower 112 to push the reciprocative member 105 downward and that the spring 115 tends to return the reciprocative member upward. The stop member 116, in limiting the return upward movement of the reciprocative member, limits the rannge of oscillation of the rocker shaft 86 accordingly and thereby determines the degree to which the two serrated rollers 30 and 32 are actuated for each intermittent advance of the uncured tube 34.

Any suitable means may be provided for driving the cam 114 to advance the uncured tube 34 and for driving the gear 85 to reciprocate the rotary knife 35. In the construction shown, a motor 124 actuates reduction gearing in a gear box 125 by means of a drive belt 126. The cam 114 is mounted on a stub shaft 128 that extends from one side of the gear box and the previously mentioned gear 87 for reciprocating the rotary knife is carried by a second stub shaft 130 that extends from the opposite side of the gear box. The motor 124 as well as the motor 78 is deenergized by opening of the switch 64.

*The Conveyor Wheel and the Marking Means*

FIGS. 1 AND 11 TO 15

The conveyor wheel 38 is journaled on an axle 132 that is carried by upright support structure including a pair of spaced parallel support plates 134 and 135 which are suitably interconnected by tie bars 136. At each periodic pause of the conveyor wheel 38, one of the previously mentioned radial pins 36 of the wheel is positioned to confront the leading end of the uncured tube 34 at a position so close to the tube end that the slicing of a ring from the tube by the rotary knife 35 displaces the sliced ring laterally onto the pin. Each of the successive rings R is carried upward with the intermittent rotation of the wheel, the ring resting partially on the peripheral surface of the conveyor wheel and partially on a fixed adjacent arcuate support 138 that has a peripheral surface flush with the wheel. The position of the arcuate support 138 adjacent the conveyor wheel 38 is best shown in FIG. 13.

As the successive rings R approach the marking means M at the upper side of the conveyor wheel 38, the rings are squeezed between the previously mentioned fixed support plate 135 adjacent one side of the wheel and an adjustable plate 140 that overhangs the arcuate support 138 and has an arcuate edge that follows the curvature of the support. At the marking station M, a portion of the support plate 135 is cut away to permit the laterally flattened ring to expand slightly to one side and to permit the marking means M to apply indicia to the underside of the ring.

As shown in FIGS. 13 and 14, the marking means may comprise a rocker lever 142 that carries three wire marking fingers 144. Between marking operations, the marking fingers 144 are dipped into a receptacle 145 having three compartments to contain ink of three different colors for the three marking fingers. When a laterally flattened ring R pauses at the marking station, the rocker arm 142 swings upward to lift the marking fingers out of the receptacle 145 against the under side of the ring, the ring being stabilized for this marking operation by a short overhanging bar 146.

As best shown in FIG. 13, the rocker lever 142 may be journaled on a pivot means 148 and may carry a pair of closely spaced followers 150 in the form of rollers to cooperate with a cam 152. A suitable tension spring 154 is connected between the outer end of the rocker lever 142 and a fixed bracket 155 to urge the followers 150 towards the cam 152. By virtue of this arrangement, the rocker lever 142 is oscillated by the cam 152 in synchronism with the intermittent rotation of the conveyor wheel 38.

The adjustable plate 140 is slidably mounted on horizontal rods 156 (FIG. 11) and its position relative to the cooperating fixed plate 135 is controlled by a pair of screws 158. The two screws 158 are journaled in the support plate 135 for rotation therein but are threaded into the adjustable plate 140. The two screws 158 are interlocked for simultaneous rotation and for this purpose the screws are provided with sprockets 160 that are interconnected by a sprocket chain 162. The lowermost screw 158 carries a suitable adjustment knob 164 that is exposed on one side of the assembly for simultaneous manual rotation of the two screws. This arrangement permits the spacing between the adjustable plate 140 and the fixed support plate 135 to be varied in accord with the different sizes of rings that are fabricated by the apparatus.

As the laterally flattened rings R progress downwardly on the conveyor wheel 38 from the marking station between the support plate 135 and the adjustable plate 140, some means is required to keep the flattened rings from being released from the wheel until the rings are in position to drop onto the transfer belt 40. For this purpose, a pair of spaced stiff wires 165 (FIGS. 11 and 12) are suitably supported adjacent the periphery of the wheel, the two wires being arcuate to conform to the peripheral curvature of the wheel. As the rings reach a position above the belt 40 and beyond the lower ends of the arcuate wires 165, they drop onto the belt. At the moment that each of the successive rings is released in this manner, the previously mentioned roller 42 rises to flex the belt 40 upward to receive the ring and keep the ring from rolling as the ring drops onto the belt.

As indicated in FIGS. 11 and 15, the roller 42 is carried by a spaced pair of rocker arms 166 on a rocker shaft 168. The rocker shaft 168 is journaled at its opposite ends in suitable brackets 170 and is controlled by an actuating arm 172. The actuating arm 172 carries a follower in the form of a roller 174 that presses against a cam 175. Thus rotation of the cam 175 causes the desired reciprocation of the roller 42.

Any suitable arrangement may be provided for actuating the conveyor wheel 38, the marking means M and the reciprocative roller 174 in synchronism with the reciprocations of the rotary knife 35. For this purpose, the conveyor wheel 38 may be intermittently advanced by a cylindrical cam 178 on a continuously rotating shaft 180 and the cam 175 for reciprocating the roller 42 may be keyed to this shaft. As indicated in FIG. 1, the shaft 180 has a pinion 182 meshed with a gear 184 on the previously mentioned stub shaft 130 for actuation by the previously mentioned motor 124 through the gear box 125.

The cylindrical cam 178 has a helical groove 185 to engage in succession a circumferential series of studs 186 on a hub portion 188 of the conveyor wheel 38. The helical groove 185 is formed with a central dwell 189, i.e., a central portion that lies in a plane of rotation instead of at an angle to the plane of rotation, the dwell causing the intermittent pauses of the conveyor wheel.

The previously mentioned cam 152 for actuating the marking means M is mounted on a suitably journaled upper countershaft 190. A sprocket 192 on this upper countershaft is connected by a sprocket chain 194 to a sprocket 195 on the shaft 180 for synchronizing the rotation of the marking cam 175 with the intermittent rotation of the conveyor wheel 38.

*The Transfer Belt and the Main Conveyor Belt*

FIGS. 1 TO 9, 11 AND 15

The transfer belt 40 is in the form of a loop stretched between a drive roller 196 at one end and an idler roller 198 at the other end with the upper run of the belt supported at an intermediate point by an idler roller 200. The drive roller 196 is mounted on a drive shaft 202 which carries a drive sprocket 204. A suitable motor 205 which is also controlled by the switch 64 actuates variable speed gearing in a gear box 206 for driving a stub shaft 208 at variable speeds. The stub shaft 208 carries a sprocket 210 which is connected by a sprocket chain 212 with the drive sprocket 204 on the drive shaft 202.

For the purpose of actuating the sweeper blade 44 and of intermittently advancing the main conveyor belt 45, the drive shaft 202 is connected to gearing in a gear box 214. For the purpose of cyclically accelerating the movement of the sweeper blade, the drive shaft 202 is connected to the gearing in the gear box 214 by the arrangement shown in FIG. 2.

In FIG. 2, a disk 215 on the end of the drive shaft 202 carries a crank pin 216 that extends into a longitudinal slot 218 in an arm 220. The arm 220 is keyed to a countershaft 222 that drives the gearing in the gear box 214, this countershaft being positioned eccentrically of the axis of the drive shaft 202. As the crank pin 216 is moved by the drive shaft 202 in an orbit eccentrically of the countershaft 222, the crank pin reciprocates along the slot 218 radially of the axis of the countershaft 222. By virtue of this arrangement, the countershaft 222 is continuously rotated by the drive shaft 202 but is rapidly accelerated during that portion of its revolution in which the crank pin 216 moves towards the inner end of the slot 218.

The gear box 214 carries and drives a shaft 224 which extends in both directions from the gear box and carries a sprocket 225 on its outer end. The sprocket 225 is connected by a sprocket chain 226 to a sprocket 227 on a countershaft 228 for actuating the sweeper blade 44.

The sweeper blade 44 is fixedly carried by elongated support means comprising a pair of levers 230 on opposite sides of the main conveyor belt 45. The forward ends of the two levers 230 are rigidly connected to a crossbar 232 on which the sweeper blade 44 is mounted. The two levers 230 are fulcrumed at intermediate points by corresponding pivots 234 on the upper ends of corresponding links 235. The lower ends of the links 235 are mounted on fixed pivots 236. The rearward ends of the two levers 230 are connected by crank pins 238 to a pair of corresponding cranks 240 on the opposite ends of a countershaft 242. The countershaft 242 carries a sprocket 244 that is connected by a sprocket chain 245 with a sprocket 246 on the previously mentioned countershaft 228.

The manner in which the sweeper blade 44 is operated and is cyclically accelerated and decelerated may be understood by reference to FIGS. 1, 4 and 7. In FIG. 4, the sweeper blade 44 is moving upwardly and rearwardly in an orbit that is indicated by the series of arrows 248. At the point in the operation shown in FIG. 4, the two cranks 240 are swinging clockwise downwardly and rearwardly to rock the two links 235 rearwardly. As the two cranks 240 subsequently swing upward to the positions indicated in FIG. 7, the sweeper blade 44 reaches the lower portion of its orbit adjacent the upper surface of the transfer belt 40 at one edge of the belt. As the cranks 240 rotate clockwise from this position in the manner indicated in FIG. 7, with the two links 235 swinging simultaneously clockwise, the sweeper blade 44 is advanced in a nearly horizontal manner across the horizontal surface of the transfer belt 40 to push a row of rings R from the transfer belt onto the main conveyor belt 45. It is in this lower portion of the orbit 248 that acceleration of the sweeper blade 44 occurs for quickly transferring the row of rings to the main conveyor belt.

FIG. 5 shows how the sweeping movement of the blade 44 deposits a small diameter ring R on the main conveyor belt 45 and FIG. 6 shows how the blade pushes a ring R of larger diameter onto the belt. With reference to FIG. 6, it is to be noted that the rate of pushing movement of the blade 44 is substantially synchronized with the rate of travel of the main belt 45 so that after the leading edge of the pliable ring R comes to rest on the main conveyor belt, the main conveyor belt functions to pull on the ring at substantially the same rate that the blade 44 pushes on the ring.

The main conveyor belt 45 is driven by a drive roller 250 and is suported in its travel by suitable underlying support structure 252. As best shown in FIG. 2, the drive roller 250 is mounted on a drive shaft 254 which has a pinion 255 meshed with a drive gear 256. The drive gear 256 is conected by a unidirectional clutch 258 with a rocker shaft 260 (FIG. 3) to be rotated in response to one direction of oscillation of the rocker shaft. The rocker shaft 260 carries a bell crank 262 for actuation by a cam 264 on the previously mentioned shaft 224 that extends from the gear box 214. One arm of the bell crank 262 carries a follower in the form of a roller 265 and the other arm of the bell crank is acted upon by a compression spring 266 between the arm and a fixed bracket 268, the function of the compression spring being to maintain the follower 265 against the cam 264.

When the rate of rotation of the transfer belt 40 is increased for changing over from a run of relatively small rings to a run of larger rings, the rate and frequency of operation of the sweeper blade 44 and both the rate of the intermittent movements of the main conveyor belt and the frequency of the intermittent movements are also and correspondingly increased because both the sweeper blade and the main conveyor belt are operated by the same power means as the transfer belt. These rates and frequencies may all be changed simultaneously and in a coordinated manner simply by varying the adjustment of the variable speed gearing in the gear box 206 to vary the rate at which the constant speed motor 205 actuates the drive shaft 202.

The adjustment of the variable speed gearing in the gear box 206 is controlled by an upwardly extending vertical shaft 270 which carries a pointer 272 for movement along a speed scale 274. The speed scale 274 is under the main conveyor belt 45 but is in a position where it may be readily observed by the operator whenever a change in adjustment is made. The vertical shaft 270 carries a worm gear 275 which is meshed with a worm 276 on a horizontal adjustment shaft 278. The adjustment shaft 278 has the previously mentioned crank 46 on its outer end.

Whenever the speed of travel of the transfer belt 40 is increased to increase the center-to-center spacing of the rings R on the belt, the magnitude of the intermittent movements of the main conveyor belt 45 should also be changed for corresponding increase in the center-to-center spacing of the rows of rings on the main conveyor belt. Since the extent of the intermittent movements of the conveyor belt 45 is determined by the extent of angular movement of the bell crank 262, the required adjustment may be provided by variably restricting the range of angular movement of the bell crank.

As shown in FIG. 2, the range of angular movement of the bell crank 262 may be variably restricted by a stop member 284 that is positioned in the path of oscillation of the bell crank. The stop member 284 is slidingly mounted on a pair of guide rods 286 and is in threaded engagement with a screw thread (not shown) on the previously mentioned horizontal adjustment shaft 278. Thus the stop member 284 functions in the manner of a traveling nut and is shifted axially whenever the crank 46 is manipulated to change the speed adjustment of the gearing in the gear box 206 for changing the rate of rotation of the drive shaft 202. The pitch direction of the screw-threaded engagement of the stop member 284 with the adjustment shaft 278 is such that rotation of the adjustment shaft to increase the rate of rotation of the drive shaft 202 retracts the stop member 284 to increase the range of movement of the bell crank by the compression spring 266 thereby to increase the magnitude of the intermittent movements of the main conveyor belt 45.

Figure 9:
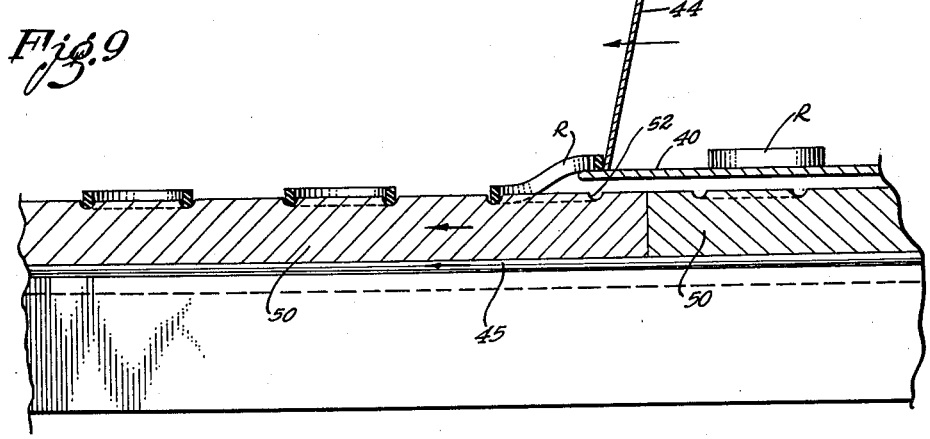
FIG. 9 is an enlarged sectional view showing how the sliced rings are swept from the transfer belt into the mold cavities.

FIGS. 8 and 9 show how a series of the previously mentioned curing molds 50 may be provided on the main conveyor belt 45 to receive the rings R from the transfer belt 40. The rate of travel of the transfer belt 40 is adjusted to vary the spacing of the rings R thereon in accord with the spacing of the mold cavities 52 and synchronization is attained to cause the sweeper blade 44 to deposit the rings in the successive rows of mold cavities. Even if perfect synchronization is not attained and the rows of rings R are dropped to positions that are merely adjacent the mold cavities, the arrangement still saves considerable handling cost since it is a simple matter to slide the individual rings manually into the mold cavities.

OPERATION

When a length of tubular stock that is being fed intermittently to the rotary knife 35 runs out, the switch 64 automatically deenergizes all three of the motors 78, 124 and 205. To put a new length of uncured tubular stock into process, the operator manipulates the handle 96 for temporary elevation of the upper serrated roller 30. To change from one diameter of tubular uncured stock to another, the operator also manipulates the handle 62 to open the clamp 60 for replacing the bushing 58 with a bushing of the new diameter. To change the thickness of the rings sliced by the rotary knife 35, the operator manipulates the crank 122 to change the position of the stop member 116 thereby to change the magnitude of the intermitent rotations of the two cooperating serrated rollers 30 and 32.

The conveyor wheel 38 receives the successive severed rings R, causes the successive rings to pause in laterally flattened state at the marking station to receive indicia in the previously described manner and then drops the marked rings onto the transfer belt 40. As each successive ring is dropped onto the transfer belt 40, the roller 42 is moved upwardly to flex the belt upward to keep the ring from rolling.

The blade 44 is operated in the previously described cyclic manner to sweep successive rows of the rings R from the transfer belt 40 onto the main conveyor belt 45 or, if desired, into corresponding rows of cavities in molds on the main conveyor belt. When relatively small rings R are being processed, the transfer belt 40 travels relatively slowly to avoid excessive center-to-center spacing of the rings on the belt and the main conveyor belt 45 also moves relatively slowly and intermittently advances by relatively small amounts to avoid excessive center-to-center spacing between the successive rows of rings on the main belt. Since the frequency of operation of the sweeper blade 44 and the frequency of intermittent movement of the main conveyor belt 45 are correlated with the rate of travel of the transfer belt, these frequencies are also correspondingly low when relatively small rings are in process.

If there is a change-over from processing rings of one size to rings of a different size, the crank 46 is appropriately manipulated. Thus, if the change-over is from rings of relatively small diameter to rings of relatively large diameter, the crank 46 is rotated in the direction to increase the speed of rotation of the drive shaft 202 and correspondingly to increase the range of oscillation of the bell crank 262 for increasing the magnitude of the intermittent movements of the main conveyor belt 45. This adjustment boosts the travel of the transfer belt 40 as required for greater center-to-center spacing of the larger rings and correspondingly increases the frequency of operation of the blade 44 to sweep the rows of larger rings onto the main cnveyor belt 45. The speed of movement of the sweeper blade 44 across the transfer belt 40 is, of course, increased, but the speed of travel of the main conveyor belt 45 is correspondingly increased to maintain synchronism so that the main conveyor belt tends to pull the larger O-rings from the transfer belt at substantially the same rate that the blade 44 tends to push the O-rings from the belt.

*The Modifications of the Invention Shown in FIGS. 16 to 21*

FIG. 16 shows in a simplified manner an alternate form of mechanism for slicing successive rings from tubular stock. Much of the structure is substantially identical to the previously described structure as indicated by the use of corresponding numerals to indicate corresponding parts. Thus the circular knife 35a and the associated structure are substantially the same as in the first embodiment of the invention. FIG. 16 additionally shows how a small atomizing nozzle 288 supported by a bracket 290 may be connected to a water line 292 and an air line 294 to direct a spray of water into the shearing zone to wet the tubular stock as the rotary knife advances.

In the construction shown in FIG. 16, the upper serrated roller 30a is on a shaft 295 that is journaled in bearing means 296 and is provided with a worm 298 meshed with a worm gear 300. In like manner, the lower serrated roller 32a is on a second shaft 302 that is journaled in bearing means 304 and carries a worm 305 meshed with a second worm gear 306. The two worm gears 300 and 306 are carried by a suitably journaled vertical drive shaft 308.

The two worm gears 300 and 306 are slidingly keyed to the vertical drive shaft 38 and the two bearing means 286 and 304 are mounted on corresponding supports 310 and 312 that are vertically movable. This arrangement permits the two serrated rollers 30a and 32a to be separated temporarily for the admission of new stock and also permits adjustment of the spacing of the two serrated rollers in accord with the thickness of the stock in process.

For manual control of the spacing of the two serrated rollers 30a and 32a, the two supports 310 and 312 have corresponding nut portions 314 and 315 of opposite thread pitch which are engaged by corresponding opposite screw threads on a vertical adjustment shaft 316. The upper end of the adjustment shaft 316 is suitably journaled in a support means 318 and is provided with a crank 320 for convenient manipulation.

The vertical drive shaft 308 is connected by a unidirectional clutch 322 with a rocker arm 324 to rotate in response to one of the two directions of oscillation of the rocker arm. The rocker arm 324 carries a follower 325 in the form of a roller and a suitable tension spring 326 is connected to the rocker arm to urge the follower against the end of a cylindrical cam 328. The cylindrical cam 328 is actuated by reduction gearing in a gear box 330 and a gear 75a for reciprocating the circular blade 35a is driven by the same gearing. For actuation of the gearing in the gear box 330, a sheave 332 on the shaft 334 of a motor 335 is connected by a belt 336 to a second sheave 338 on a stub shaft 340.

In a previously described manner, the amount by which the tubular stock is advanced intermittently by the serrated rollers 30a and 32a is controlled by varying the freedom for return movement of the rocker arm 324 under the force exerted by the tension spring 326. In the construction shown, a stop member 342 in the path of the rocker arm 324 is suitably supported for sliding movement along a fixed member 344 having a scale 345 that is calibrated in terms of magnitude of intermittent advance of the tubular stock 34, i.e., calibrated in terms of thickness of the rings R that result from the slicing operation. Integral with the stop member is a pointer 346 that moves along the scale 345.

The stop member 342, together with the pointer 346, may be controlled by an adjustment crank 348 on a rod 350 that is in threaded engagement with a bracket 352. The inner end of the adjustment rod 350 has a swivel connection with a clevis 354 which is connected by a pin 355 with a downward extension 356 of the stop member. Thus rotation of the crank 348 causes longitudinal shift of the adjustment rod 350 with corresponding shift in the position of the stop member 342. The stop member 342 may be immobilized in any selected position of adjustment by means of a thumb nut 358 on a screw that extends through a slot 360 in the fixed member 344.

The apparatus is shown in FIG. 16 as dropping the successive severed rings R into a suitable tray 362. FIGS. 17 to 21 show how uncured elastomer tubes may be telescoped together so that each slicing operation forms more than one ring to drop into the tray.

One purpose of telescoping the elastomer tubes together may be simply to increase production and reduce costs by producing a plurality of rings in each slicing cycle. A purpose that may be even more important, however, is to make it possible to use the apparatus in FIG. 16 for slicing rings from tubular stock that otherwise could not be handled by the apparatus. For example, it may be difficult to process tubular stock of exceedingly small diameter in the described manner but there may be no difficulty in processing a bundle of small uncured elastomer tubes telescoped into a larger diameter tube of uncured elastomer. As another example, it may be difficult to process in the described manner a large diameter tube of uncured elastomer that has such a thin wall that the tube is flimsy. Such a flimsy tube may be folded on itself longitudinally, however, and telescoped into an uncured tube of smaller diameter to form a composite tube that may be readily processed by the apparatus.

FIG. 17 shows a concentric tube assembly comprising three outer uncured elastomer tubes 364, 365 and 366 with relatively thick walls together with two smaller tubes 368 and 370 having smaller walls. The three outer tubes may be telescoped together primarily to increase production and the two smaller tubes may be telescoped into the assembly primarily because it would otherwise be difficult to slice the smaller rings.

FIG. 18 shows a relatively large diameter tube 372 of uncured elastomer that is flimsy because of its large diameter and because it has a relatively thin wall. This tube 372 is collapsed and folded inward longitudinally for telescoping into a second tube 374 in the manner indicated. The second tube 374 has sufficient rigidity for processing by the apparatus by virtue of its smaller diameter and thicker wall.

FIG. 19 shows a bundle of relatively small tubes 375 of various diameters which for the purpose of slicing are held together by a surrounding tube 376.

FIG. 20 shows a small tube 378 that would be difficult to process in the described manner but this smaller tube is telescoped into a larger thick-walled tube 380 which may be readily processed.

FIG. 21 shows a tube 382 of uncured elastomer stock which is too thin for handling by the described apparatus but which is telescoped over a thicker walled tube 384 to provide a tube assembly that may be easily and efficiently processed.

In all of these assemblies shown in FIGS. 17 to 21, the telescoped tubes reinforce each other. Thus, a number of tubes, each of which would be too weak and flexible for processing, may be combined to reinforce each other in a manner to make possible processing by the described apparatus. In each instance one of the elastomer tubes may be used solely for support during the slicing operation since rings of the size of the tube are needed. The rings sliced from such a support tube are collected and remilled to provide elastomer stock that may again be extruded to form tubes.

My description in detail of the specific embodiments and applications of the invention will suggest various changes, substitutions and other departures from my disclosure within the spirit and scope of the appended claims.

I claim:

1. An apparatus to receive and convey successive elastomeric rings for processing, comprising: means to engage the successive severed rings from inside each ring to draw the ring along a predetermined path; means adjacent said path to confine and contract each ring in its plane to an elongated configuration in the course of travel; means adjacent said path to apply indicia to the elongated rings; means to actuate said ring-engaging means intermittently in synchronism with said severing means for pause of the ring engaging means to receive the severed rings and for pause for application of indicia to the elongated rings; and means to operate said indicia-applying means in synchronism with said ring-engaging means to apply indicia to the elongated rings during the pauses of the ring-engaging means.

2. A combination as set forth in claim 1 in which said means to confine and elongate the rings is adjustable for runs of rings of different sizes.

3. An apparatus to convey successive elastomeric rings from a receiving station to a belt for processing, comprising:
- a wheel adjacent said receiving station and positioned above said belt, said wheel having a circumferential series of engagement means comprising projections on the wheel to engage each of the successive rings from inside the ring at the receiving station, and to convey the successive rings in an arcuate path to the belt under the wheel, said projections being spaced apart on the wheel to place one of the projections over the belt whenever one of the projections is at said receiving station;
- means to rotate said wheel intermittently with the wheel pausing to receive the elastomeric rings at the receiving station and to release the rings to said belt;
- means to retain the rings in engagement with said projections on the wheel until the rings reach positions over the belt; and
- means under said belt synchronized with the intermittent movements of said wheel to flex the belt upward periodically toward said projections to receive the successive rings without permitting the rings to roll.

4. An apparatus to receive and convey successive elastomeric rings for processing, comprising: a wheel having a circumferential series of means to engage each of the successive rings from the inside and to convey the successive rings in an arcuate path to a transfer station under the wheel; means adjacent said wheel providing an arcuate surface conforming to a circumferential portion of the periphery of the wheel to support portions of the traveling rings; means to confine the traveling rings from opposite sides along said support means to contract the rings in their planes to elongated configuration; means to actuate said wheel intermittently with the wheel pausing to receive the rings and to immobilize the elongated rings momentarily; and means synchronized with said wheel to apply indicia to the successive elongated rings during the pauses in the rotation of the wheel.

5. A combination as set forth in claim 4 in which said means to confine the rings from opposite sides comprises a pair of spaced walls with at least one of the walls adjustable relative to the other for runs of rings of different sizes.

6. In an apparatus to fabricate O-rings from an uncured elastomer tube, the combination of: rotary means to engage and advance said tube longitudinally; reciprocative means; a first means to move said reciprocative means in one of its two directions; means to oppose the movement of the reciprocative means in said one direction and to return the reciprocative means in the opposite direction; means including a unidirectional clutch operatively connecting said reciprocative means to said rotary means for intermittent actuation of the rotary means to advance said tube intermittently; a second means to sever successive rings from the leading end of said tube; actuating means operatively connected to both said first and second means to operate the first and second means in synchronism for severance of the rings during pauses in the advance of the tube; stop means to limit the return movement of said reciprocative means by said opposing means, said stop means being adjustable to vary the magnitude of the intermittent advances of the tube; and a wheel having a circumferential series of means to receive the severed rings for further processing, said wheel being operatively connected with said actuating means to be rotated intermittently in synchronism with said severing means with the wheel pausing to receive the successive severed rings.

7. A combination as set forth in claim 6 in which said wheel has a circumferential series of projections; and in which a cylindrical cam driven by said actuating means in synchronism with said rotary means has a helical cam groove to engage the successive projections to rotate the wheel, said helical groove having a dwell to cause the wheel to pause to receive the successive severed rings.

8. An apparatus to receive a succession of objects and to arrange said objects in successive advancing rows, comprising:
- a relatively wide main conveyor;
- a belt spaced above said main conveyor transversely thereof to feed said objects thereto;
- means to deposit said objects on said belt in sequence thereby forming a row of the objects moving to the region above said main conveyor;
- a sweep member in said region to sweep successive pluralities of the objects off said belt onto said conveyor to deposit successive rows of the objects on the conveyor with the rows extending transversely of the conveyor;
- a support means having one end rigidly connected to said sweep member;
- link means supported at one end by fixed pivot means and pivotally connected at the other end to said support means at an intermediate point of the support means;
- power actuated crank means pivotally connected to the other end of said support means at a fixed point thereof to move said other end in a circular orbit thereby to oscillate said link means and said support means, said support means, link means and crank means being dimensioned to move said sweep member in a closed path above said belt with the lower portion of the path approximately conforming to the surface of the belt, said power actuated crank means being synchronized with the belt for one rotation for each increment of travel of the belt substantially equal to the width of the sweep member; and
- means to advance said main conveyor intermittently to carry objects thereon away from the region of said belt, said advancing means being synchronized with said power actuated crank means.

9. An apparatus to receive a succession of objects and to arrange the objects in successive advancing rows comprising:
- a relatively wide main conveyor;
- a belt spaced above said main conveyor transversely thereof to feed said objects thereto;
- means to deposit said objects on said belt in sequence, thereby forming a row of the objects moving to the region above said main conveyor;
- means in said region to sweep successive pluralities of the objects off said belt onto said conveyor to deposit successive rows of the objects on the conveyor with the rows extending transversely of the conveyor, said sweeping means being synchronized with the belt for one operation for each increment of travel of the belt substantially equal to the width of the sweeping means, said sweeping means comprising a sweep member, a support means having one end rigidly connected to said sweep member and link means supported at one end by fixed pivot means and pivotally connected at the other end to said support means at an intermediate point of the support means;
- crank means pivotally connected to the other end of said support means to move said other end in a circular orbit thereby to oscillate said link means and said support means, said support means, link means and crank means being dimensioned to move said sweep member in a closed path above said belt with the lower portion of the path approximately conforming to the surface of the belt;

means to advance said main conveyor intermittently to carry objects thereon away from the region of said belt, said advancing means being synchronized with said sweeping means; and power actuated means to drive said crank with acceleration of that portion of the orbit of the crank movement that corresponds to said lower portion of the closed path of the sweep member.

10. A combination as set forth in claim 9 in which said means to drive said crank means includes: an arm rotating about a first axis and operatively connected to said crank means; a second crank slidingly connected with said arm to drive the arm, said second crank having a second axis of rotation offset from said first axis whereby the driving connection of the second crank with the arm reciprocates along the arm radially of said first axis with consequent cyclic acceleration of the arm.

11. An apparatus to receive a succession of objects and to arrange said objects in successive laterally advancing rows, comprising: a relatively wide main conveyor; a belt spaced above said main conveyor transversely thereof to feed said objects thereto; means to deposit said objects successively on said belt at a given frequency whereby spacing of the objects on the belt depends on the speed of travel of the belt; means to sweep successive pluralities of said objects off said belt onto said conveyor thereby to deposit successive rows of the objects on the conveyor with the rows extending transversely of the conveyor, said sweeping means being synchronized with the belt for one operation for each increment of travel of the belt substantially equal to the width of the sweeping means; means to vary the speed of travel of said belt and to correspondingly vary the frequency of operation of said sweeping means and the frequency of advance of the conveyor; and means to vary the magnitude of intermittent movement of said conveyor, said two varying means being interconnected for speeding up said belt and increasing the magnitude of the intermittent movements of the conveyor when relatively large objects are deposited on said belt at said given frequency thereby to space the large objects adequately on the belt and to space the rows of large objects adequately on the conveyor means.

12. An apparatus to receive a succession of objects and to arrange said objects in successive laterally advancing rows, comprising: a relatively wide main conveyor; a belt spaced above said main conveyor transversely thereof to feed said objects thereto; means to deposit said objects successively on said belt at a given frequency whereby spacing of the objects on the belt depends on the speed of travel of the belt; cyclic means to sweep objects off said belt onto said conveyor; reciprocative means; means including a unidirectional clutch operatively connecting said reciprocative means to said main conveyor for intermittent advance of the main conveyor; power means operatively connected with said belt and said cyclic means; cam means actuated by said power means to move said reciprocative means in one of its two directions of movement; spring means to return said reciprocative means in its other direction of movement; and stop means to limit the return movement of said reciprocative means by said spring means, said stop means being adjustable to vary the magnitude of the intermittent advance of said conveyor means.

13. A combination as set forth in claim 12 which includes means to vary the speed of operation of said power means and includes means to vary the position of said stop means, said two varying means being interconnected for speeding up said belt, correspondingly increasing the frequency of operation of said cyclic means, correspondingly increasing the frequency of advance of the main conveyor, and increasing the magnitude of the intermittent advance of the conveyor when relatively large objects are deposited on said belt at said given frequency thereby spacing the large objects adequately on the belt and spacing the rows of large objects adequately on the conveyor.

14. In an apparatus for handling a succession of objects, the combination of: a conveyor belt; a first intermittent conveyor means to deposit the objects in succession onto said belt to form a row of objects thereon; a second intermittent conveyor means passing under said belt transversely thereof; means synchronized with said belt to sweep successive rows of the objects from the belt onto said second intermittent conveyor means; means to vary the speed of travel of said belt and correspondingly vary the frequency of operation of said sweeping means and the frequency of advance of said second conveyor means; and means to vary the magnitude of the intermittent advance of said second conveyor means, said two varying means being interconnected for simultaneous adjustment for varying the spacing of the objects on the belt means and the spacing of the rows of objects on said second conveyor means.

References Cited in the file of this patent

UNITED STATES PATENTS

| | | | |
|---|---|---|---|
| Re. 18,162 | Freeman | Aug. 25, | 1931 |
| 334,274 | Norton | Jan. 12, | 1886 |
| 1,009,411 | Heater | Nov. 21, | 1911 |
| 1,560,070 | McNamara | Nov. 3, | 1925 |
| 1,958,422 | Dinzl | May 15, | 1934 |
| 2,363,033 | Adams | Nov. 21, | 1944 |
| 2,411,693 | Peare et al. | Nov. 26, | 1946 |
| 2,429,496 | Sutter | Oct. 21, | 1947 |
| 2,449,399 | Lyon | Mar. 7, | 1950 |
| 2,528,779 | Pinney | Nov. 7, | 1950 |
| 2,612,982 | Michaux | Oct. 7, | 1952 |
| 2,636,215 | Smith | Apr. 28, | 1953 |
| 2,660,759 | Davis et al. | Dec. 1, | 1953 |
| 2,642,936 | Semler | June 23, | 1953 |
| 2,796,986 | Rajchman | June 25, | 1957 |
| 2,913,768 | Lecluyse et al. | Nov. 24, | 1959 |

FOREIGN PATENTS

| | | | |
|---|---|---|---|
| 563,537 | Canada | Sept. 23, | 1958 |